United States Patent
Strauch et al.

(10) Patent No.: US 11,050,596 B2
(45) Date of Patent: *Jun. 29, 2021

(54) DEVICES, SYSTEMS AND METHODS FOR NARROW BAND COMMUNICATIONS WITHIN PROTOCOL HAVING FREQUENCY MULTIPLEXING

(71) Applicant: Cypress Semiconductor Corporation, San Jose, CA (US)

(72) Inventors: Paul Strauch, Pleasanton, CA (US); Ayush Sood, Bangalore (IN); Kiran Uln, Pleasanton, CA (US); Kamesh Medapalli, San Jose, CA (US); Prasanna Kumar Sethuraman, Bangalore (IN); Rajendra Kumar Gundu Rao, Bangalore (IN); Saishankar Nandagopalan, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,743

(22) Filed: Jul. 7, 2020

(65) Prior Publication Data
US 2021/0006442 A1    Jan. 7, 2021

Related U.S. Application Data

(63) Continuation of application No. 16/366,695, filed on Mar. 27, 2019, now Pat. No. 10,721,107.

(51) Int. Cl.
*H04L 27/26* (2006.01)
*H04W 4/80* (2018.01)
(Continued)

(52) U.S. Cl.
CPC ...... *H04L 27/2613* (2013.01); *H04L 27/2605* (2013.01); *H04W 4/80* (2018.02); *H04L 5/0007* (2013.01); *H04W 84/12* (2013.01)

(58) Field of Classification Search
CPC ............. H04L 27/2613; H04L 27/2605; H04L 5/0007; H04W 4/80; H04W 84/12
See application file for complete search history.

(56) References Cited

U.S. PATENT DOCUMENTS 10,721,107 B1 *  7/2020  Strauch ............... H04L 27/2602
2010/0315939 A1  12/2010  Verbin et al.
(Continued)

OTHER PUBLICATIONS

International Search Report for International application No. PCT/US2020/015248 dated Mar. 3, 2020, 2 pages.
(Continued)

*Primary Examiner* — Mohammad S Anwar

(57) ABSTRACT

Devices, systems and methods generate a packet including a first preamble and a narrow band packet. Embodiments assign a first frequency band to the first preamble and assign a second frequency band to the narrow band packet. The second frequency band is a first sub-band of the first frequency band. Embodiments transmit the packet by transmitting the first preamble across the first frequency band and transmitting the narrow band packet across the second frequency band. The narrow band packet includes a second preamble and narrow band packet data.

20 Claims, 9 Drawing Sheets

(51) Int. Cl.
*H04L 5/00* (2006.01)
*H04W 84/12* (2009.01)

(56) References Cited

U.S. PATENT DOCUMENTS

| | | |
|---|---|---|
| 2013/0235943 A1 | 9/2013 | Tong |
| 2017/0063589 A1 | 3/2017 | Chen et al. |
| 2018/0077641 A1 | 3/2018 | Yang |
| 2019/0174497 A1 | 6/2019 | Wang et al. |

OTHER PUBLICATIONS

USPTO Advisory Action for U.S. Appl. No. 16/366,695 dated Nov. 25, 2019, 3 pages.
USPTO Final Rejection for U.S. Appl. No. 16/366,695 dated Sep. 13, 2019, 12 pages.
USPTO Non-Final Rejection for U.S. Appl. No. 16/366,695 dated Jun. 27, 2019, 11 pages.
USPTO Non-Final Rejection for U.S. Appl. No. 16/366,695 dated Dec. 23, 2019, 14 pages.
USPTO Notice of Allowance for U.S. Appl. No. 16/366,695 dated Mar. 10, 2020; 6 pages.
Written Opinion of the International Searching Authority for International application No. PCT/US2020/015248 dated Mar. 3, 2020, 5 pages.

\* cited by examiner (BACKGROUND)

DEVICES, SYSTEMS AND METHODS FOR NARROW BAND COMMUNICATIONS WITHIN PROTOCOL HAVING FREQUENCY MULTIPLEXING

This application is a Continuation of U.S. patent application Ser. No. 16/366,695, filed on Mar. 27, 2019, which is hereby incorporated by reference herein in its entirety.

TECHNICAL FIELD

The present disclosure relates generally to wireless networks, and more particularly to extending a range of a wireless network.

BACKGROUND

Conventional WLAN devices can establish communication connections over a number of channels, each occupying a different frequency bandwidth. To increase bandwidth efficiency, wireless standard have been developed that frequency divide an available channel to enable multi-user multiple-input multiple output (MU-MIMO) communications over the same channel.

FIG. 10 is a diagram showing transmissions according to the IEEE 802.11ax standard that includes MU-MIMO communications. FIG. 10 shows a conventional packet that can be transmitted over a channel having a bandwidth of about 20 MHz. The conventional packet can begin with a legacy preamble followed by a high efficiency (HE) preamble. Subsequently, data for different destinations can be transmitted on different resource units (RUs), which can each occupy a different portion of the channel bandwidth. Orthogonal frequency division multiple access modulation is used to transmit different data streams on the separate RUs in parallel with one another.

While MU-MIMO capabilities can make better use of available spectra, any ability to extend a communication range in a wireless device could further improve the performance of a wireless network and/or enable new applications for wireless networks.

DETAILED DESCRIPTION

According to embodiments, a wireless communication device can transmit packet data with a first preamble over a channel followed by transmissions in a number of resource units (RUs), that can be portions of the channel. A narrow band packet, including a narrow band preamble, can be transmitted in one of the RUs.

According to embodiments, one or more data streams can be transmitted in the RUs in parallel with the narrow band packet. The data streams do not include preambles and can be for destinations different from that of the narrow band packet.

According to embodiments, transmission over the RUs can be according to an orthogonal frequency division multiple access (OFDMA) modulation.

In some embodiments, a narrow band packet can be transmitted with a higher power spectral density (PSD) than the first preamble, and thus reach a greater range.

In some embodiments, the data in a narrow band packet can enable processing gains as compared to data transmitted across the full channel. Such a feature can enable the narrow band packet to be received at greater ranges.

Figure 1A:
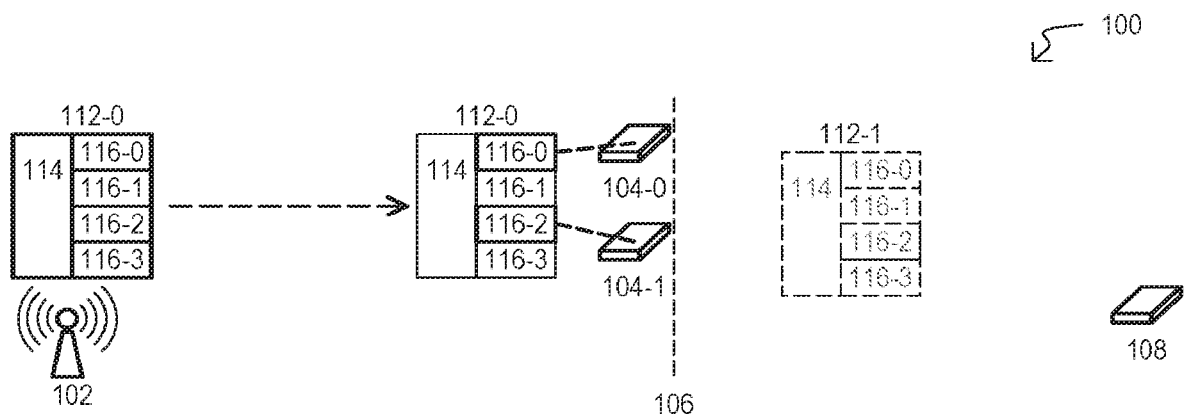
FIGS. 1A to 1E are diagrams of systems and operations according to embodiments.
Figure 1B:
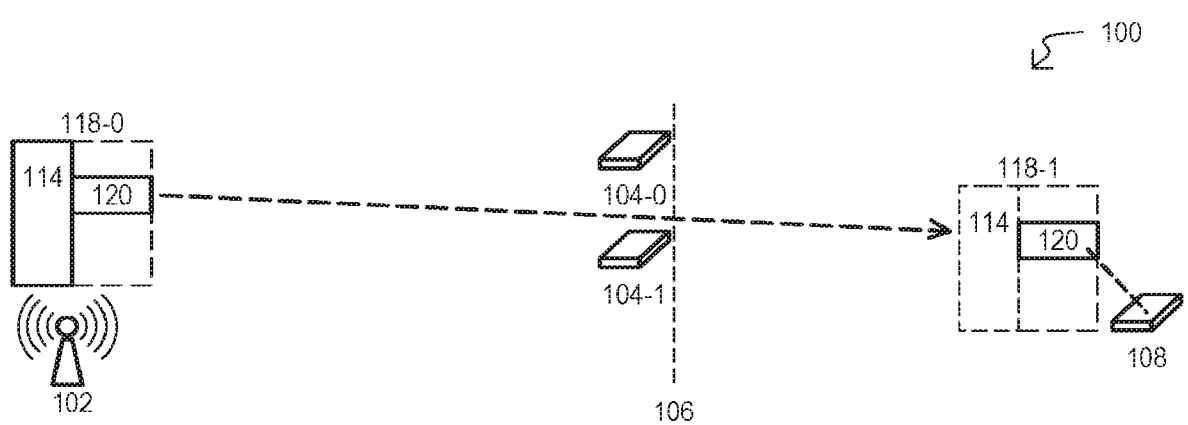
Figure 1C:
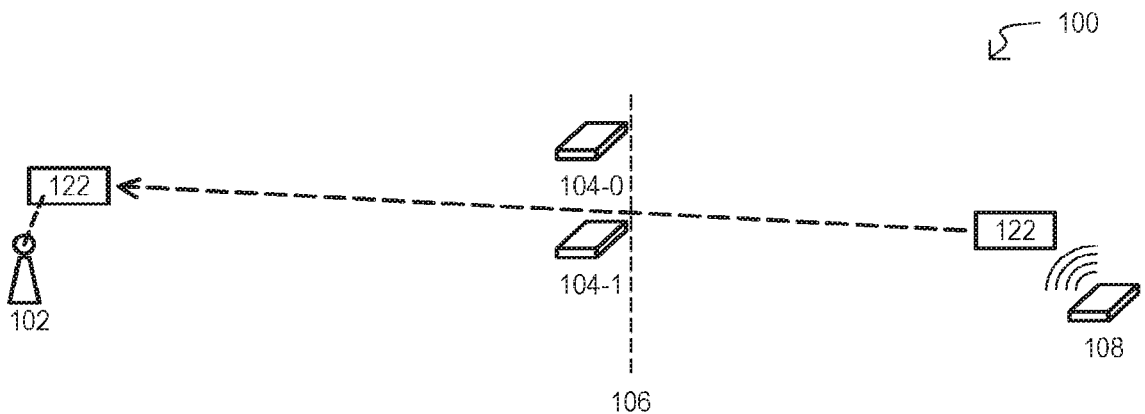

FIGS. 1A to 1C are a sequence of block diagrams of a system 100 and operations according to embodiments. A system 100 can include an access point device (AP) 102, first station devices 104-0/1 and a second station device 108. An AP 102 can connect various station devices (104-0/1, 108) in a network. While devices are referred to as APs and station devices, this should not be construed as implying any particular network topology or communication protocol.

Referring to FIG. 1A, AP 102 can make a transmission 112-0 that includes a full band preamble 114 followed by data transmitted in multiple sub-bands in parallel with one another (116-0 to -3). Sub-band transmissions (116-0 to -3) can occur in different portions of a channel used to transmit full band preamble 114. In some embodiments, frequency multiplexing can be used to divide data sets into different sub-band transmissions (116-0 to -3). Channel transmissions can have a range 106.

Referring still to FIG. 1A, because first station devices 104-0/1 are within range 106, first station devices 104-0/1 can detect the full band preamble 114 and receive transmission 112-0. Each first station device (104-0/1) can de-multiplex a sub-band transmissions to receive the data sent therein. In FIG. 1A, first station device 104-0 is the destination for sub-band transmission 116-0, while first station device 104-1 is the destination for sub-band transmission 116-2.

As represented by transmission 112-1, full band preamble 114 cannot be detected and/or decoded beyond range 106. Accordingly, second station device 108 cannot successfully receive the transmission 112-0 from AP 102.

Referring to FIG. 1B, AP 102 can make an extended range transmission 118-0.

An extended range transmission 118-0 can include a full channel preamble 114 followed by a narrow band packet 120 included in one of the sub-bands. A narrow band packet 120 can include a portion (e.g., preamble) to signal the narrow band packet to a receiving device. A narrow band packet 120 can have a greater range than a full channel transmission (e.g., preamble 114). Such greater range can arise for various reasons, including but not limited to: the environment (i.e., the environment favors the sub-band over other portions of the channel), transmission power (i.e., the narrow band packet can be transmitted at a higher PSD than the full channel preamble 114), or packet format (i.e., the narrow band preamble packet data enables processing gains over full channel transmissions).

Referring still to FIG. 1B, as represented by transmission 118-1, beyond range 106, the full channel preamble 114 (and possibly some of the other sub-bands) cannot be detected or decoded. However, second station device 108 can be monitoring the sub-band on which the narrow band packet 120 is transmitted. Due to the extended range of narrow band packet 120, second station device 108 can successfully receive and decode the narrowband packet 120. It is understood that such an operation can occur without using any of the full channel preamble 114.

Referring to FIG. 1C, following the receipt of a narrow band packet 120 from AP 102, second station device 108 can transmit a narrow band response 122. Narrow band response 122 can be transmitted in the same sub-band as the narrow band packet 120 or can be transmitted in some other narrow band (i.e., a frequency band smaller than the channel used for the full channel preamble 114).

A response 122 can have a larger range than a channel (e.g., full band) transmission, or AP 102 can be configured to receive signals at greater ranges. Consequently, AP 102 can receive the response 122. According to the response 122 (or by further long range handshaking with second station device 108), AP 102 and second station device 108 can establish one or more narrow bands (e.g., sub-bands) for communication.

Figure 1D:
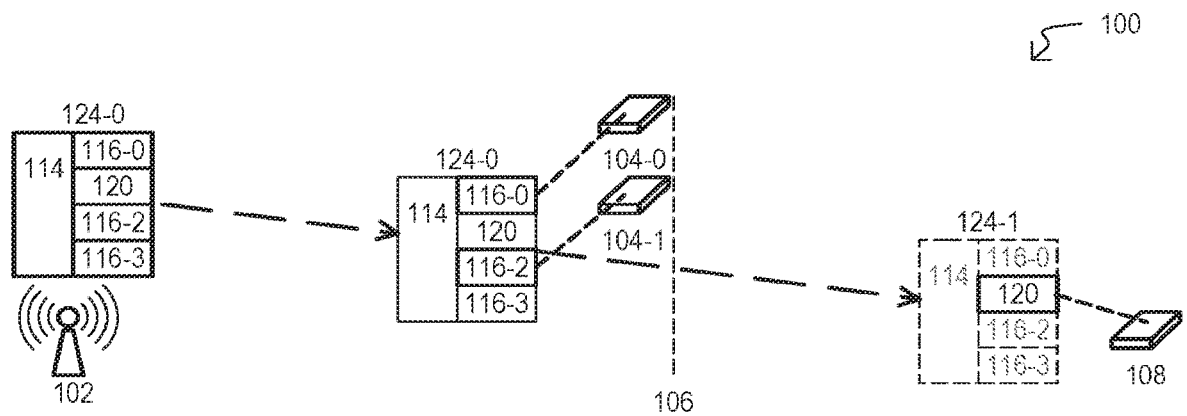

Referring to FIG. 1D a block diagram shows a system 100 and operations according to additional embodiments. A system 100 can include items like those of FIGS. 1A to 1C, and like items are referred to by the same reference character.

In FIG. 1D, an AP 102 can make a transmission 124-0 that includes a full channel preamble 114 followed by data in multiple sub-band transmissions (116-0, 116-2/3), which are in parallel with a narrow band packet 120. First station devices 104-0/1 can be configured to detect full channel preamble 114 and subsequently extract data values from sub-bands 116-0 and 116-2.

Referring still to FIG. 1D, as represented by transmission 124-1, a full channel preamble 114 and one or all of the sub-band transmissions (116-0, 116-2/3) are not detectable/decodable beyond range 106. However, second device 108 can be configured to monitor the sub-band on which narrow band packet 120 is transmitted. Due to the extended range of narrow band packet 120, second station device 108 can successfully receive and decode the narrowband packet 120. Subsequently, a second station device 108 can transmit a response, as described with reference to FIG. 1C.

While embodiments have shown transmissions in which a single sub-band can be used for extending a transmission range, other embodiments can use more than one sub-band. Such an arrangement is shown in FIG. 1E.

Figure 1E:
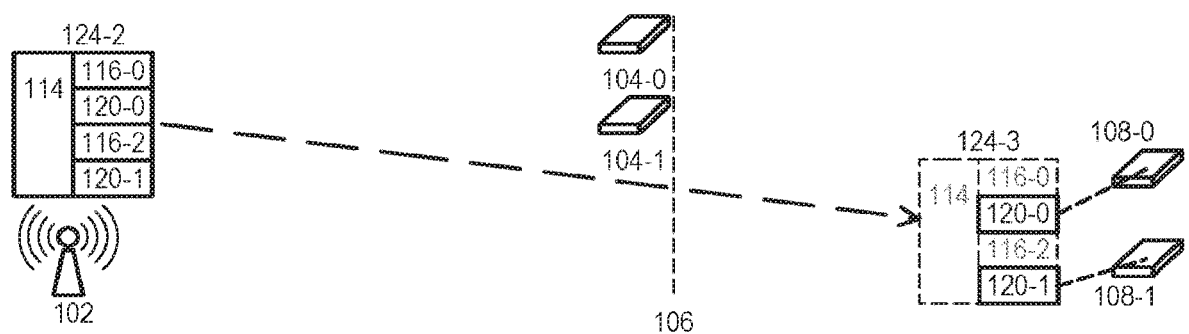

Referring to FIG. 1E a block diagram shows a system 100 and operations according to additional embodiments. A system 100 can include items like those of FIG. 1D, and like items are referred to by the same reference character.

FIG. 1E differs from FIG. 1D in that a transmission 124-2 from an AP 102 can include multiple narrow band packets in different sub-bands. In the particular example show, two narrow band packets 120-0/1 can be transmitted across different sub-bands. As represented by transmission 124-3, a full channel preamble 114 and one or all of the sub-band transmissions (116-0/2) are not detectable/decodable beyond range 106. However, second station device 108-0 can be configured to monitor and receive data on the sub-band corresponding to narrow band packet 120-0, while second station device 108-1 can be configured to monitor and receive data on the sub-band corresponding to narrow band packet 120-1. Subsequently, a second station devices 108-0/1 can transmit responses, as described with reference to FIG. 1C.

While transmissions according to embodiments can take any suitable form, particular transmission structures will now be described.

Figure 2A:
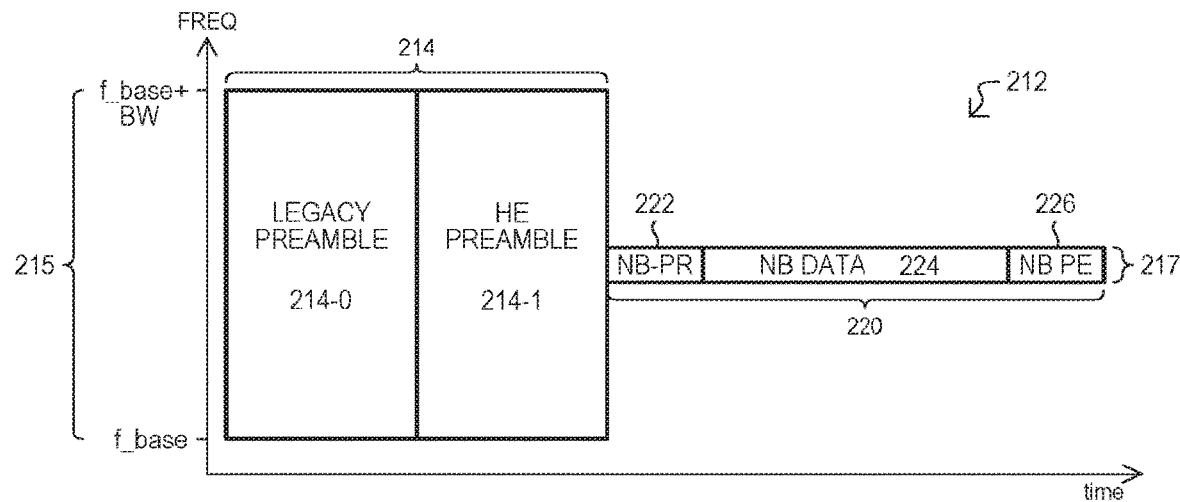
FIG. 2A to 2C are diagrams of transmissions and transmission data formats according to embodiments.

FIG. 2A shows a transmission 212 according an embodiment. It is understood the data for such a transmission can be stored as data in buffer circuits or the like, then subsequently modulated into the channel and sub-bands as shown. Similarly, at least a narrow band packet portion (e.g., 220) can be demodulated and stored as data in buffer circuits, or the like. Thus, the transmission should not be construed as limited to an intangible signal.

Referring still to FIG. 2A, a transmission 212 can include a full channel preamble 214 followed by a narrow band packet 220. A full channel preamble 214 can be transmitted across a channel 215 that extends from some base frequency (f_base) by some bandwidth amount (BW). According to embodiments, BW can be at least 20 MHz. A full channel preamble 214 can include a first portion 214-0 and a second portion 214-1. Such different portions 214-0/1 can be used to signal different transmission methods. In the embodiment shown, first portion 214-0 can be a legacy preamble while second portion 214-1 can be a high efficiency preamble. In some embodiments, full channel preamble 214 can take the form of a preamble transmitted according to the IEEE 802.12ax standard.

Referring still to FIG. 2A, following full channel preamble 214, a transmission 212 can include a narrow band packet 220. A narrow band packet 220 can include one or more portions that can distinguish it as an individual packet of its own. In some embodiments, a narrow band packet 220 can include its own preamble 222, data 224 and a packet extension field 226. Accordingly, a narrow band packet 220 can be detected regardless, or without use of, full channel preamble 214. A narrow band packet 220 is transmitted across a smaller frequency band 217 than full channel 215. According to embodiments, frequency band 217 can be no more than about 50% of channel bandwidth 215, no more than about 25% of channel bandwidth 215, or no more than about 10% of channel bandwidth 215.

In some embodiments, narrow band packet 220 can enable a greater transmission range than full channel preamble 214 (or other full channel transmissions). In some embodiments, a narrow band packet 220 can be transmitted with a greater PSD than full channel signals. In addition or alternatively, a narrow band packet 220 can enable greater range through packet structure (i.e., processing gains), including but not limited to: longer training fields, data repetition, slower data transmission rates, larger error detection and correction codes.

It is noted that a narrow band packet 220 can have a greater PSD than a full channel preamble 214 by transmitting at a same power (but over a smaller range of frequencies).

Figure 2B:
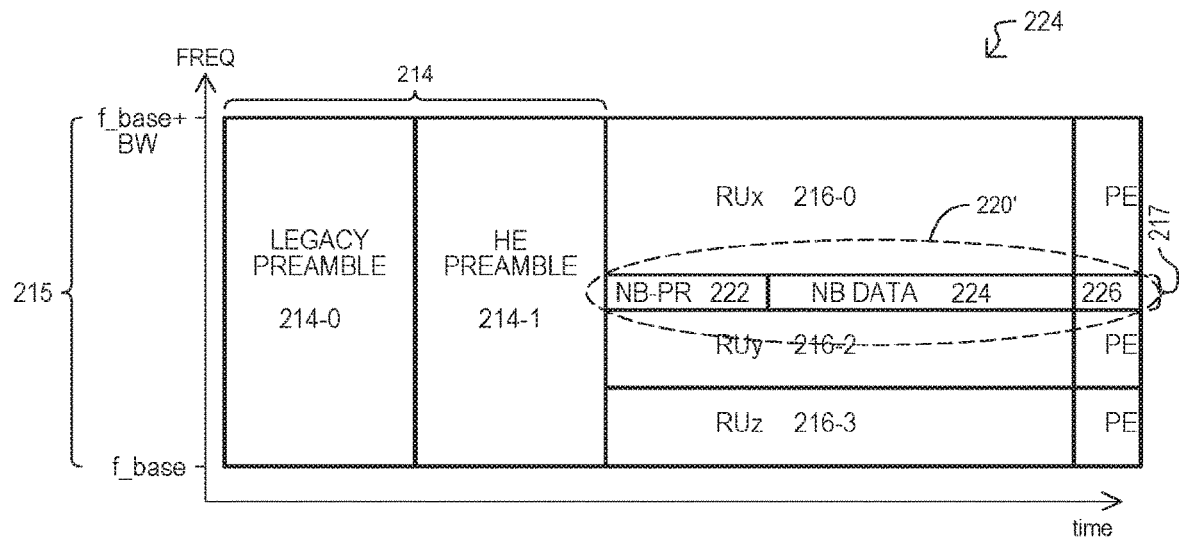

FIG. 2B shows a transmission 224 according another embodiment. As in the case of FIG. 2A, such a transmission should not be construed as being limited to an intangible signal. A transmission 224 can include a full channel preamble 214 as in the case of FIG. 2A.

Unlike FIG. 2A, in FIG. 2B a full channel preamble 214 can be followed by a narrow band packet 220' transmitted in parallel with data streamed over one or more resource units (RUx, RUy, RUz) which occupy other portions of channel bandwidth 215. In some embodiments, a transmission 224 can be made with a frequency division operation that can transmit in parallel over a number of different RUs of different bandwidth. A narrow band packet 220' can be transmitted in an RU having a smallest bandwidth. In some embodiments, RUs can take the form of RUs of the IEEE 802.12ax standard.

While a range of narrow band packet 220' can be greater than full channel transmissions according to any of the embodiments described herein, in some embodiments the longer range of narrow band packet 220' can be achieved by packet structure as described herein, or equivalents (i.e., processing gains).

Figure 2C:
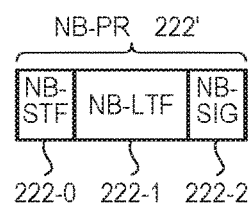

Referring to FIG. 2C, a narrow band preamble 222' according to an embodiment is shown in a diagram. A narrow band preamble 222' can include a short training field (NB STF) 220-0, a long training field (NB LTF) 222-1, and a signaling field (NB SIG) 222-2. In some embodiments, NB STF 220-0 can be used by a station device to detect the narrow band packet and determine a coarse frequency offset for receiving the narrow band packet. NB LTF 220-1 can be used by a station device for signal synchronization and fine frequency offset. NB SIG 220-2 can be used by a station device to determine a length of the narrow band packet, as well as provide more information about the packet (e.g., modulation information, etc.). It is understood that the various fields of a narrow band preamble 222' can be transmitted across the sub-band (e.g., 217), which is smaller than the channel bandwidth (215).

Figure 3A:
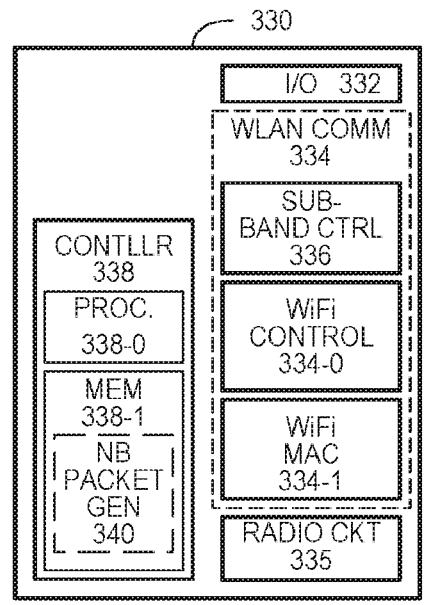
FIG. 3A is a block diagram of a device according to an embodiment.

FIG. 3A is a block diagram of a device 330 according to an embodiment. In some embodiments, device 330 can be one particular implementation of an AP like that shown as 102 in FIGS. 1A to 1E. Device 330 can transmit messages having a leading full channel preamble, followed by a narrow band packet in a frequency multiplexed sub-band.

A device 330 can include communication circuits 334, controller 338, radio circuits 335, and input/output (I/O) circuits 332. Communication circuits 334 can enable operations in one or more channels, as well as control of data transmitted in parallel on sub-bands. Sub-bands can have a frequency range of less than 20 MHz. In some embodiments, sub-bands can correspond to RUs of the IEEE 802.11ax standard, or an equivalent standard that can divide channels into sub-bands. Communication circuits 334 can include WLAN circuits, including a WiFi control circuit 334-0 and WiFi media access control (MAC) circuits 334-1. WLAN circuits can operate in any suitable band, including a 2.4 GHz band, 5.0 GHz band and/or 6.0 GHz band. In some embodiments, WLAN circuits can be compatible with a wireless IEEE 802.11 standard, such as the IEEE 802.11ax standard. In addition, communication circuits 334 can include sub-band control circuits 336. Sub-band control circuits 336 can enable narrow band packets to be inserted into one or more sub-bands and/or the generation of a narrow band preamble on a sub-band.

Radio circuits 335 can include circuits for receiving and transmitting signals according to at least one protocol over one or more channels and corresponding sub-bands.

A controller 338 can control transmissions by communication circuits 334. In some embodiments, a controller 338 can include circuits (or instructions executable by circuits) for generating a narrow band packet 340. This can include the generation of a narrow band preamble. In the particular embodiment, shown, controller 338 includes a processor section 338-0 and a memory section 338-1.

In some embodiments, device 330 can be an integrated circuit device, with the various portions being included in one integrated circuit package or formed in a same integrated circuit substrate.

Figure 3B:
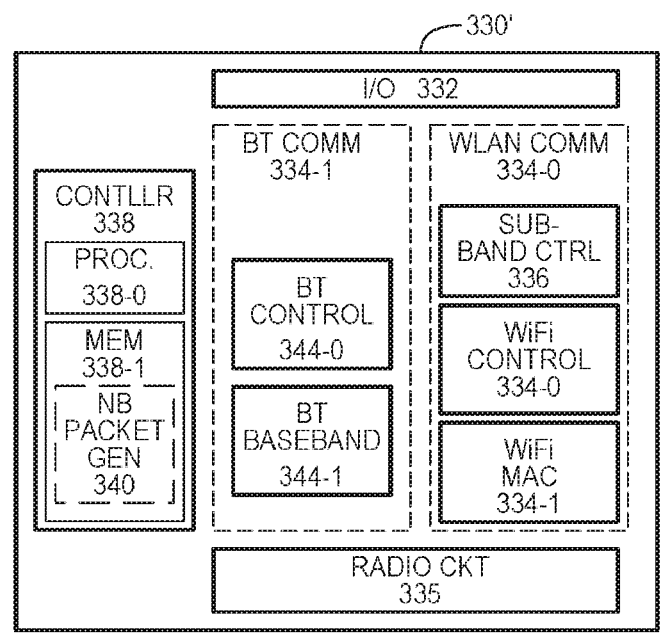
FIG. 3B is a block diagram of a combination device according to an embodiment.

FIG. 3B is a block diagram of a combination device 330' according to an embodiment. A combination device 330' can include wireless circuits for operating in a WLAN mode which can insert narrow band packets into sub-bands, as well as a Bluetooth (BT) mode. Combination device 330' can include sections like those shown in FIG. 3A, including first communication circuits 334-0, which can correspond to those shown as 334 in FIG. 3A. Other like sections are referred to by the same reference characters.

In addition, combination device 330' can include second communication circuits 334-1. Second communication circuits 344-1 can be BT circuits including BT control circuits 344-0 and BT baseband circuits 344-1. BT circuits can operate in a 2.4 GHz band according to a BT standard.

In some embodiments, device 330' can be an integrated circuit device, as described herein.

Figure 4A:
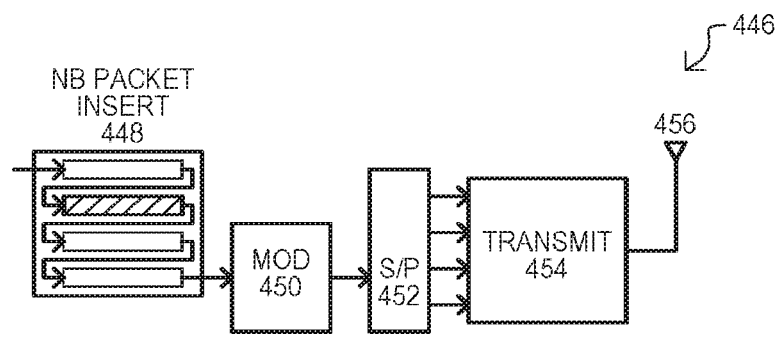
FIGS. 4A and 4B are block diagrams of modulation and demodulation circuits that can be included in embodiments.
Figure 4B:
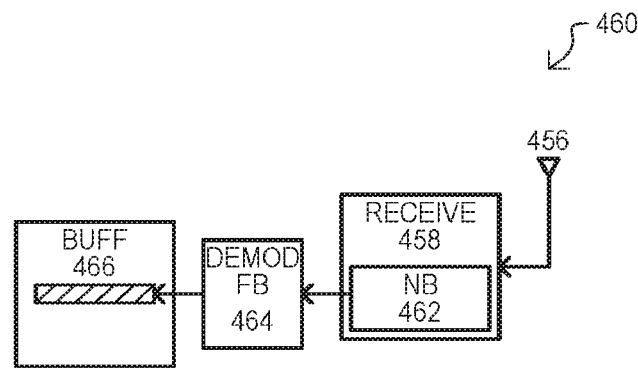

FIGS. 4A and 4B show examples of modulation and demodulation circuits that can be included in embodiments. FIG. 4A shows a modulation path 446 that can include a narrow band packet insertion section 448, a modulation section 450, a serial to parallel converter (SP) 452, a transmit section 454, and an antenna system 456. A packet insertion section 448 can include circuits that provide a stream of bits or symbols for transmission over multiplexed sub-bands. Packet insertion section 448 can enable data for a narrow band packet to be inserted into a symbol/bit stream so that it is transmitted on the desired sub-band after multiplexing. In some embodiments, such narrow band packet data can include values that will result in generation of a desired narrow band preamble. However, in other embodiments, other sections of modulation path 446 can generate a narrow band preamble.

Modulation section 450 can modulate a symbol/bit stream from packet insertion section 448 according to a predetermined method. In some embodiments, modulation section 450 can create a desired narrow band preamble that will appear on the sub-band for the narrow band packet. However, in other embodiments, other sections can generate a narrow band preamble.

SP 452 can convert symbol/bit stream into parallel streams, each corresponding to a different sub-band. Such parallel streams can then be transmitted in parallel over different sub-bands by transmit section 454. In some embodiments, transmit section 454 can generate a desired narrow band preamble in the sub-band containing the narrow band packet.

In some embodiments, modulation path 446 can use orthogonal frequency-division multiple access modulation (OFDMA) to create the parallel sub-bands.

FIG. 4B shows a demodulation path 460 that can include antenna system 456, receive section 458, demodulation section 464, and buffer 466. A receive section 458 can receive signals over various bands, including sub-bands of a larger bandwidth channel. A receive section 458 can include narrow band detect portion 462, which can detect a narrow band preamble on a sub-band that can indicate a narrow band packet. A demodulation section 464 can demodulate received values to arrive and narrow band packet data, which can be stored in buffer 466. It is understood that a demodulation path 460 could also include a frequency division counterpart to that shown in FIG. 4A, as well (e.g., OFDMA demodulator).

In some embodiments, modulation/demodulation circuits, like those of FIGS. 4A and 4B, can use a same modulation for both full channel and narrow band packet transmissions. In particular, DSSS modulation can be used for both channel and narrow band transmissions.

Figure 4C:
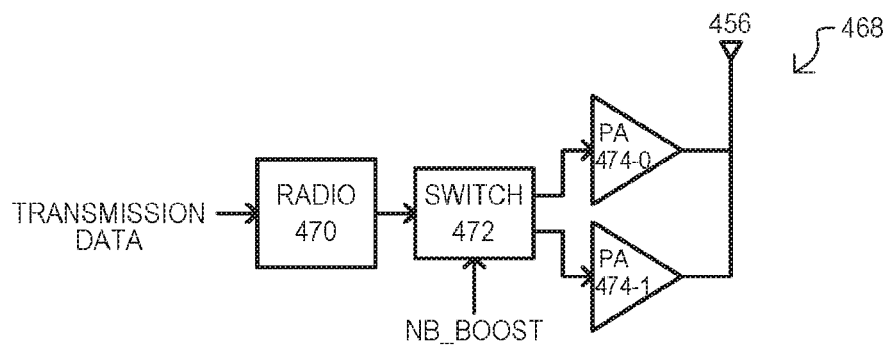
FIG. 4C is a diagram of transmission circuits that can be included in embodiments.

FIG. 4C is a block schematic diagram of a transmission circuit 468 that can be included in embodiments. A transmission circuit 468 can enable the boosting of a narrow band packet portion of a transmission, to thereby increase the range of the narrow band packet. A transmission circuit 468 can include radio circuits 470, a switch section 472, a first (PA) 474-0 and a second PA 474-1. Radio circuit 470 can generate the analog signals for a transmission. A transmission can include a first part (e.g., full channel preamble) followed by a second part (e.g., narrow band packet). Such a transmission can take the form of any of those shown in FIG. 1B and/or FIG. 2A, or equivalents.

Switch section 472 can switch a signal from radio circuits 470 to either first PA 474-0 or second PA 474-1, according to signal NB_BOOST. First PA 474-0 can be designed or configured to transmit over a full channel according to a predetermined PSD. In some embodiments, such a predetermined PSD can include a power limit restriction. PA 474-1 can be designed or configured to transmit over a sub-band according to another predetermined PSD that is greater than that of full channel transmissions provided by the other PA 474-0.

Accordingly, after a full channel preamble is transmitted via first PA 474-0, a transmission circuit 468 can switch to second PA 474-1, thereby boosting the power of the narrow band packet.

Figure 5:
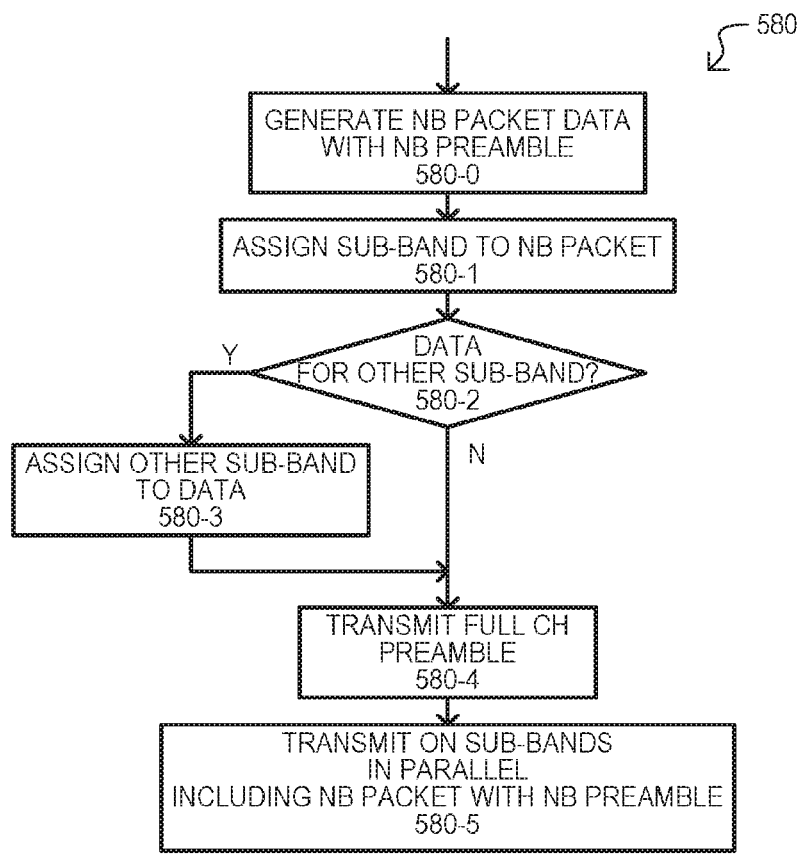
FIG. 5 is a flow diagram of a method for an access point device (AP) according to an embodiment.

FIG. 5 is a flow diagram of method 580 according to an embodiment. A method 580 can be executed by a device, such as an AP or the like, such as that shown as 102 in FIGS. 1A to 1E. A method 580 can include generating NB packet data 580-0. Such an action can include generating data to populate fields of a narrow band packet. In some embodiments, this can include generating data for one or more preamble fields that will result in a desired preamble when the packet is transmitted over a sub-band.

A method 580 can include assigning a sub-band to the narrow band packet 580-1. Such an action can include assigning a narrow band packet 580-1 to one of multiple sub-bands over which data can be transmitted in parallel.

A method 580 can determine if data is to be transmitted on any other sub-band (580-2) (i.e., sub-bands not assigned to a narrow band packet). If data is to be transmitted in another sub-band (Y from 580-2), such a sub-band can be assigned to the data 580-3.

A method 580 can then transmit a full channel preamble 580-4. A full channel preamble can be a preamble transmitted over a bandwidth that is greater than and/or can include all the sub-bands.

A method 580 can then transmit on the sub-bands in parallel 580-5, including a narrow band packet with a narrow band preamble 580-6. Such an action can include transmitting data in their assigned sub-bands as well the narrow band packet in its assigned sub-band.

It is understood that a method 580 can include transmitting more than one narrow band packet in different sub-bands in parallel with one another, with each narrow band packet having a narrow band preamble.

Figure 6:
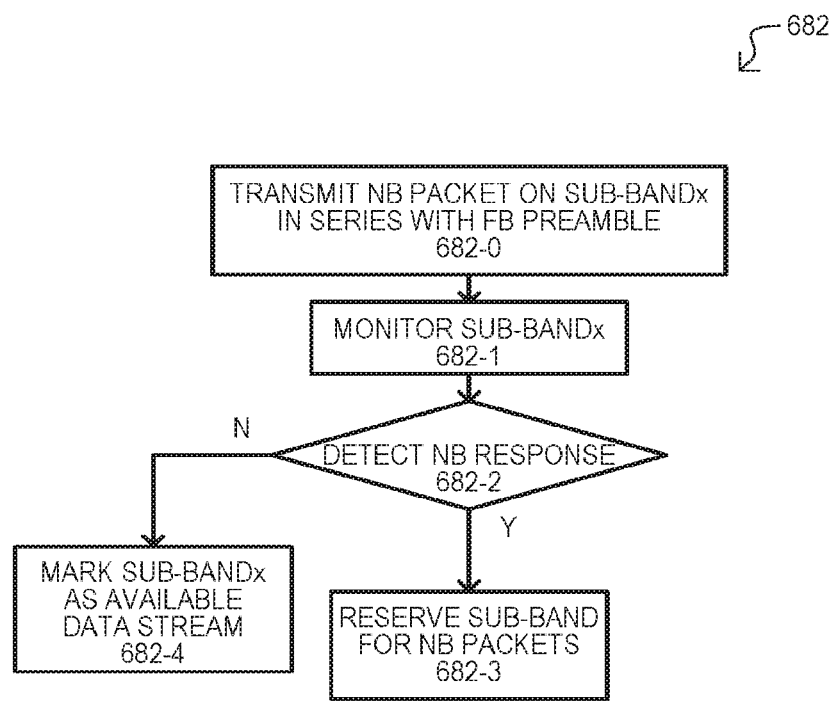
FIG. 6 is a flow diagram of a method of an AP according to another embodiment.

FIG. 6 is a flow diagram of method 682 according to another embodiment. A method 682 can be executed by an AP or the like (e.g., 102 in FIGS. 1A to 1E). A method 682 can include transmitting a narrow band packet on a sub-band (SUB-BANDx) in series with a full channel preamble 682-0. Such an action can include transmitting a full channel preamble across a first bandwidth followed by a narrow band packet across a second bandwidth, where the second bandwidth is only a portion of the first bandwidth.

A method 682 can monitor the sub-band on which the narrow band packet was transmitted 682-1. Such an action can include monitoring the sub-band for a particular type of response. In some embodiments, this can include monitoring the sub-band for a narrow band preamble.

If a narrow band response is detected (Y from 682-2), a method 682 can reserve a sub-band for narrow band packets 682-3. Such an action can include reserving the sub-band on which the narrow band packet was transmitted (SUB-BANDx), reserving a sub-band indicated by data in the received response, and/or reserving a sub-band according to predetermined instructions. In particular embodiments this can include assigning a narrow band packet to a RU of a device operating according to the IEEE 802.11ax specification, or an equivalent.

If a narrow band response is not detected (N from 682-2), a method 682 can indicate that the sub-band is available for a data stream 682-4. In some embodiments, this can include indicating a RU corresponding to the sub-band is available in an IEEE 802.11ax system.

Figure 7:
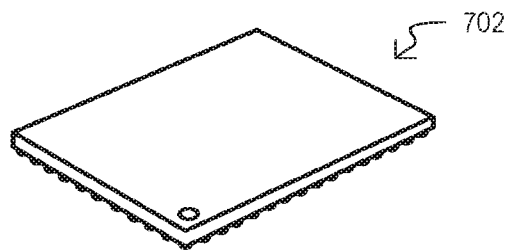
FIG. 7 is a diagram of a device according to another embodiment.

While embodiments can include systems with various interconnected components, embodiments can also include unitary devices which can issue transmissions with a full channel preamble followed by a narrow band packet in a sub-band with its own preamble, as described herein or equivalents. In some embodiments, such unitary devices can be advantageously compact single integrated circuits (i.e., chips). FIG. 7 shows one particular example of a packaged single chip device 702. However, it is understood that a device according to embodiments can include any other suitable integrated circuit packaging type, as well as direct bonding of a combination device chip onto a circuit board or substrate.

Figure 8:
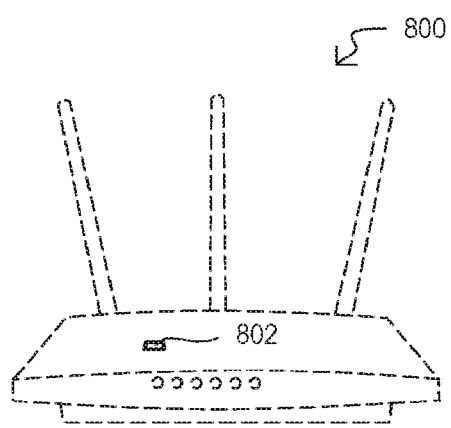
FIG. 8 is a diagram of a system according to another embodiment.

Referring to FIG. 8, another system according to an embodiment is shown in a diagram. A system can include a router device 800. Router device 800 can provide routing functions for a first protocol (e.g., WLAN) while also enabling a second, extended range protocol, which can utilize narrow band packets transmitted in a sub-band. In some embodiments, router device 800 can include a device 802 like that shown in FIG. 7.

Figure 9:
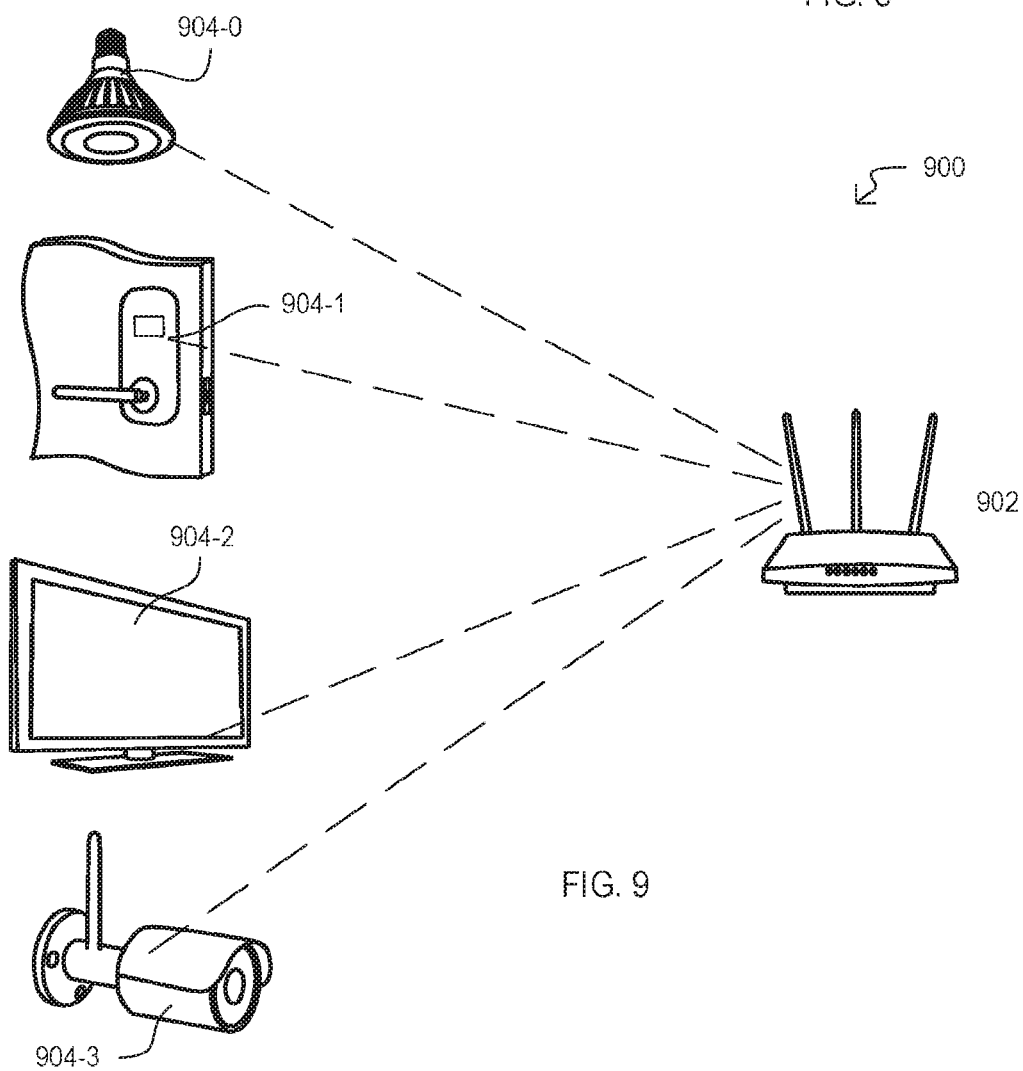
FIG. 9 is a diagram of a system according to another embodiment.
Figure 10:
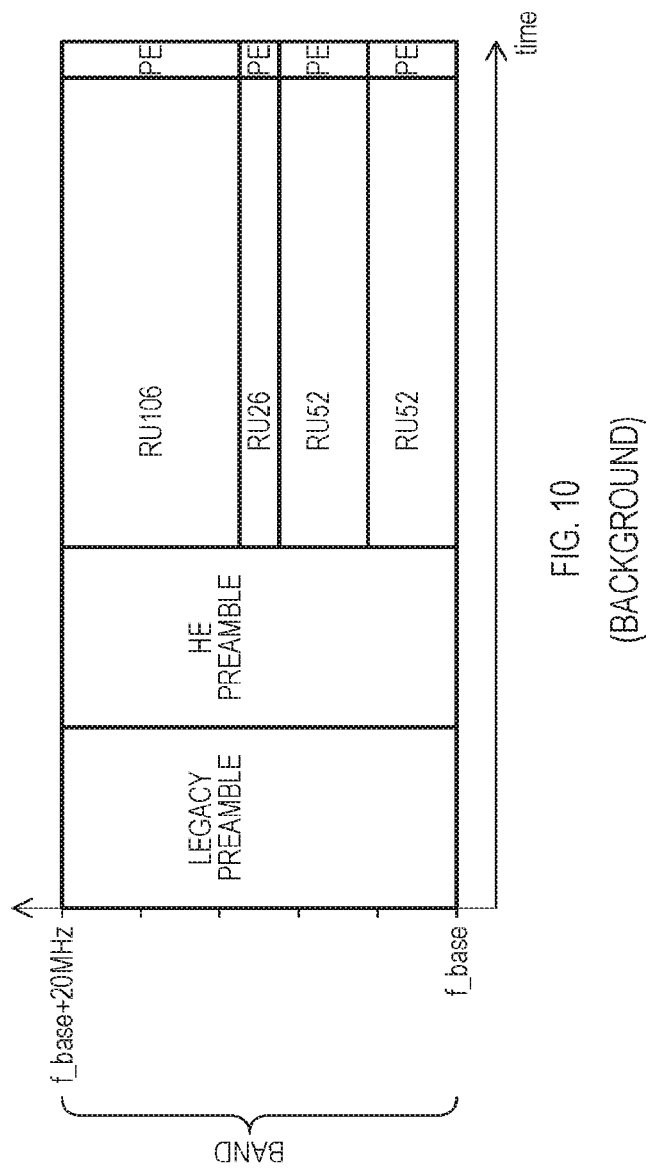
FIG. 10 is a diagram of a conventional packet format.

FIG. 9 shows a system 900 according to another embodiment. A system 900 can include various local devices 904-0 to -3 and a gateway device 902. Local devices (904-0 to -3) can include various Internet-of-thing (IoT) type devices, which can operate as station devices. In the embodiment shown, local devices can be home automation devices, including lighting devices 904-0, locking devices 904-1, entertainment devices 904-2 and security devices 904-3, as but a few of many possible examples.

A gateway device 902 can communicate with local devices 904-0 to -3 according to a frequency multiplexing protocol, such as the IEEE 802.11ax standard or equivalent. However, gateway device 902 can further transmit a narrow band packet in a sub-band to extend an overall range of the system 900, as described herein, or equivalents. Thus, any or all local devices 904-0 to -3 can be located at a further range than conventional systems.

Enabling the transmissions of narrow band packets within a sub-band of a frequency multiplexing system can provide advantages over conventional networks, such as increased range to station devices. As but one example, in an IEEE 802.11ax environment, the signal-to-noise ration can be improved by about 6 dB when using a RU26 compared to a RU106 which results in tens of meters range extension depending on the environment.

While embodiments can execute channel communications according to any suitable protocol, in some embodiments such communications can be according to any suitable IEEE wireless standard, including but not limited to 802.11(a), 802.11(b), 802.11(g), 802.11(h), 802.11(ac) and/or 802.11 (ax). Further, embodiments can transmit across channels of any suitable wireless communication band, including but not limited to a 2.4 GHz band, 5.0 GHz band and/or 6.0 GHz band. Channels can have any suitable bandwidth size, including about 5 MHz, 10 MHz, 20 MHz, 40 MHz, 80 MHz and 160 MHz, with narrow bands having a smaller bandwidth than their corresponding channel(s).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
   generating a packet including a first preamble and a narrow band packet;
   assigning a first frequency band to the first preamble;
   assigning a second frequency band to the narrow band packet, wherein the second frequency band is a first sub-band of the first frequency band; and
   transmitting the packet comprising, transmitting the first preamble across the first frequency band and transmitting the narrow band packet across the second frequency band, wherein the narrow band packet comprises a second preamble and narrow band packet data.

2. The method of claim 1, wherein generating the packet comprises generating the packet including further data, the method further comprising assigning a third frequency band to the further data, wherein the third frequency band is a second sub-band of the first frequency band, wherein the transmitting of the packet comprises transmitting the narrow band packet across the second frequency band concurrently, at least in part, with transmitting the further data across the third frequency band.

3. The method of claim 2, wherein transmitting the packet comprises transmitting the narrow band packet to a different destination than the further data.

4. The method of claim 1, wherein the packet is configured to encode a plurality of resource units to be transmitted in parallel, each resource unit corresponding to a different sub-band of the first frequency band, wherein transmitting the packet comprises transmitting the narrow band packet in a resource unit compatible with the IEEE 802.11ax standard.

5. The method of claim 1, wherein the second preamble is configured to be used for detection of the narrow band packet without use of the first preamble.

6. The method of claim 1, wherein transmitting the packet comprises using a same modulation for the first preamble and the second preamble.

7. The method of claim 1, wherein transmitting the narrow band packet includes using orthogonal frequency division multiple access modulation to transmit the narrow band packet across the second frequency band.

8. The method of claim 1, wherein the packet is compatible with the IEEE 802.11ax wireless standard.

9. A wireless device comprising:
   communication circuitry configured to transmit a packet;
   a memory configured to store instructions;
   one or more processors configured to execute the instructions to cause the wireless device to
   generate the packet including a first preamble and a narrow band packet;
   assign a first frequency band to the first preamble;
   assign a second frequency band to the narrow band packet, wherein the second frequency band is a first sub-band of the first frequency band; and
   cause the communication circuitry to transmit the first preamble across the first frequency band and transmit the narrow band packet across the second frequency band, wherein the narrow band packet comprises a second preamble and narrow band packet data.

10. The wireless device of claim 9, wherein the one or more processors are configured to execute the instructions to cause the wireless device to modulate different data sets into a plurality of sub-bands of the first frequency band, each sub-band corresponding to a different resource unit, wherein the narrow band packet data is one of the different data sets.

11. The wireless device of claim 10, wherein the one or more processors are configured to execute the instructions to cause radio circuits of the wireless device to transmit signals over the first frequency band followed by signals over each of the plurality of sub-bands in parallel with one another.

12. The wireless device of claim 9, wherein the one or more processors are configured to execute the instructions to form the first preamble according to an IEEE 802.11 wireless standard.

13. The wireless device of claim 9, wherein the communication circuitry is configured to transmit the narrow band packet data after the first preamble.

14. The wireless device of claim 9, wherein the one or more processors are configured to execute the instructions to modulate at least one of the first preamble and second preamble according to orthogonal frequency division multiple access.

15. A system comprising:
   one or more antennas;
   communication logic; and
   a controller configured to cause the communication logic to transmit, via the one or more antennas, full channel packets with a first preamble in a first channel followed by separate data streams in a plurality of sub-bands of the first channel in parallel, at least one data stream comprising a narrow band packet having a second preamble.

16. The system of claim 15, wherein the first preamble is transmitted according to an IEEE 802.11 wireless standard.

17. The system of claim 15, wherein the first preamble and second preamble have a same modulation.

18. The system of claim 15, wherein the first preamble includes at least one training field; and the second preamble includes at least one training field.

19. The system of claim 15, wherein the communication logic is configured to transmit the narrow band packet in a smallest bandwidth resource unit of the plurality of sub-bands.

20. The system of claim 19, wherein the communication logic is configured to transmit the full channel packets according to the IEEE 802.11ax standard and the resource unit is in accordance with the IEEE 802.11ax standard.

* * * * *